United States Patent
Lo et al.

(10) Patent No.: US 8,416,729 B2
(45) Date of Patent: Apr. 9, 2013

(54) OPTIMIZING DOWNLINK THROUGHPUT WITH USER COOPERATION AND SCHEDULING IN ADAPTIVE CELLULAR NETWORKS

(75) Inventors: Ernest Sze Yuen Lo, Hong Kong (CN); Khaled Ben Letaief, Hong Kong (CN)

(73) Assignee: Lingna Holdings Pte., LLC, Wilmington, DE (US)

( * ) Notice: Subject to any disclaimer, the term of this patent is extended or adjusted under 35 U.S.C. 154(b) by 1187 days.

(21) Appl. No.: 12/037,974

(22) Filed: Feb. 27, 2008

(65) Prior Publication Data

US 2008/0219222 A1 Sep. 11, 2008

Related U.S. Application Data

(60) Provisional application No. 60/894,208, filed on Mar. 10, 2007.

(51) Int. Cl.
*H04B 7/14* (2006.01)
*H04W 4/00* (2009.01)
*H04J 3/00* (2006.01)
*H04B 7/185* (2006.01)

(52) U.S. Cl. ........ 370/315; 370/329; 370/345; 370/431; 455/11.1; 455/13.4

(58) Field of Classification Search .................. 370/274, 370/275, 279, 310, 313, 315, 319, 320, 321, 370/325, 328–329, 334, 336, 339, 345, 431; 455/11.1, 403, 422.1, 426.1, 426.2, 445, 455/500, 517, 550.1, 553.1, 560, 561, 562.2
See application file for complete search history.

(56) References Cited

U.S. PATENT DOCUMENTS 7,529,548 B2 * 5/2009 Sebastian .................. 455/452.1
2007/0010196 A1 * 1/2007 Periyalwar et al. ............... 455/7
(Continued)

FOREIGN PATENT DOCUMENTS

| JP | 08084373 | 3/1996 |
| JP | 2007049696 | 2/2007 |
| KR | 1020080054422 A | 6/2008 |

OTHER PUBLICATIONS

Zhao, et al., Practical Relay Networks: A Generalization of Hybrid-ARQ IEEE Journal on Selected Areas in Communications, vol. 23 No. 1, Jan. 1, 2005 [online], (Retrieved on Sep. 30, 2008) Retrieved from the internet: <URL: http://ieeexplore.ieee.org/application/enterprise/entconfirmation.jsp?amumbe~1374955~ p. 7 col. 2 to p. 8 col. 2, p. 11 col. 1, p. 12 col. 1.

(Continued)

*Primary Examiner* — Habte Mered
(74) *Attorney, Agent, or Firm* — Turocy & Watson, LLP

(57) ABSTRACT

User cooperation is an emerging transmission framework where users act as relays of each other to provide extra diversity paths for better overall performance. In various embodiments, systems and methods for transmitting data from a basestation to a mobile device in an adaptive communications network including user cooperation are provided. Among various embodiments, relaying is performed according to a time division duplex (TDD) system according to either a downlink-assisted relaying (DAR) which performs a relaying operation in a defined supplemental downlink timeslot or according to an uplink-assisted relaying (UAR) which performs a relaying operation in a defined supplemental uplink timeslot. Among other embodiments, relay transmissions according to a max-throughput scheduling algorithm which achieves a maximum system throughput without imposing any fairness constraints on users or according to a round-robin scheduling algorithm which achieves absolute fairness in terms of delays among the considered users. The downlink throughput is optimized from the basestation to the mobile device utilizing either amplify-and-forward (AF) or decode-and-forward (DF) cooperation protocols.

38 Claims, 13 Drawing Sheets

U.S. PATENT DOCUMENTS

| | | | |
|---|---|---|---|
| 2007/0160014 A1* | 7/2007 | Larsson | 370/338 |
| 2007/0280172 A1* | 12/2007 | Tan et al. | 370/335 |
| 2008/0009243 A1* | 1/2008 | Hart | 455/67.13 |
| 2008/0186900 A1* | 8/2008 | Chang et al. | 370/315 |
| 2008/0219229 A1 | 9/2008 | Zheng | |
| 2010/0039947 A1* | 2/2010 | Li et al. | 370/252 |

OTHER PUBLICATIONS

Chung et al, "Time Slot Allocation Based on Region and Time Partitioning for Dynamic TDD-OFDM Systems" Vehicular Technology Conference, 2006. IEEE 63rd, vol. 5 pp. 2459-2463, May 7-10, 2006[online], (Retrieved on Sep. 30, 2008) Retrieved from the Internet: <URL: http://ieeexplore.ieee.org/stamp/stamp.jsp?arnumber=1683299&isnumber=35445 > Abstract, Fig 1, p. 2459-2460.

Khojastepour, "Distributed Cooperative Communications in Wireless Networks" PhD Thesis, Rice University Houston, Jan. 3, 2005,. (Retrieved on Sep. 30, 2008) Retrieved from the internet: <URL: http://scholarship.rice.edu/bitstream/handle/1911/20023/Kho2005Jan3Distribute.PDF?> pp. 248-282.

International Search Report and Written Opinion dated Oct. 16, 2008 for PCT Application Serial No. PCT/IB2008/000837, 15 Pages.

A. Sendonaris, "Increasing uplink capacity via user cooperation diversity," in Proc. IEEE ISIT'98, pp. 156, Aug. 1998.

A. Sendonaris, "User cooperation diversity—part 1: system description," IEEE Trans. Comm., vol. 51, No. 11, pp. 1927-1938, 2003.

T. Cover and E. Gamal, "Capacity theorems for the relay channel," IEEE Trans. IT, vol. IT-25, No. 5, pp. 572-584, 1979.

J. N. Laneman and G. W. Wornell, "Distributed space-time-coded protocols for exploiting cooperative diversity in wireless networks," IEEE Trans. IT, vol. 49, pp. 2415-2425, Nov. 2003.

J. N. Laneman et al., "Cooperative diversity in wireless networks: efficient protocols and outage behavior," IEEE Trans. IT, vol. 50, No. 12, pp. 3062-3080, Dec. 2004.

R. U. Nbarr, et al., "Fading relay channels: performance limits and space-time signal design," IEEE JSAC, vol. 22, No. 6, pp. 1099-1109, Aug. 2004.

T. E. Hunter and A. Nostratinia, "Cooperation diversity through coding," in Proc. IEEE ISIT'02, Jul. 2002.

Ernest S. Lo and K. B. Letaif, "Transmit Side Information Assisted User Cooperation for Multiple-Antenna Wireless Networks," in Proc. IEEE PIMRC'05, pp. 1915-1919, Sep. 2005.

Y. Zhao et al., "Improving amplify-and-forward relay networks: optimal power allocation versus selection," in Proc. IEEE ISIT'06, pp. 1234-1238, Jun. 2006.

O. Munoz et al., "Cellular capacity gains of cooperative MIMO transmission in the downlink," in Proc .IEEE IZS'04, pp. 22-26, Feb. 2004.

G. Kramer et al., "Cooperative strategies and capacity theorems for relay networks," IEEE Trans. IT, pp. 3037-3063 Sep. 2005.

P. Zhang et al., "A Vision from the future: beyond 3G TDD," IEEE Comm. Mag., vol. 43, pp. 38-44, Jan. 2005.

C.Y. Wong et al., "Multiuser OFDM with adaptive subcarrier, bit, and power allocation," IEEE JSAC, vol. 17, No. 10, pp. 1747-1758, Oct. 1999.

* cited by examiner

Uplink-Assisted Relaying 500

OPTIMIZING DOWNLINK THROUGHPUT WITH USER COOPERATION AND SCHEDULING IN ADAPTIVE CELLULAR NETWORKS

CROSS-REFERENCE TO RELATED APPLICATIONS

This application claims priority to U.S. Provisional Application Ser. No. 60/894,208, filed on Mar. 10, 2007, entitled "OPTIMIZING DOWNLINK THROUGHPUT WITH USER COOPERATION AND SCHEDULING IN ADAPTIVE CELLULAR NETWORKS", the entirety of which is incorporated herein by reference.

TECHNICAL FIELD

The subject disclosure relates to optimizations for downlink throughput with user cooperation and scheduling in adaptive cellular networks.

BACKGROUND

User cooperation has been of growing interest recently where extra spatial diversity can be achieved by allowing users to relay the messages of each other to the destination. Conventionally, user cooperation has been proposed for improving the capacity of a cellular network and has been closely related to transmission in a relay channel. Since then, on top of the idea of a general relay network, several efficient cooperative protocols have developed. For instance, multiple cooperating users with multiple antennas have been considered; however, all of the existing systems focus only on the performance and operation of fixed source and destination pairs without considering the higher-level system perspective. For instance, the effects of user scheduling have not been considered. In addition, the conventional relaying protocols often require dedicated relaying timeslots, potentially incurring a spectral loss.

Accordingly, it would be desirable to explore different scheduling strategies on user cooperation for a conventional cellular network to form more optimal strategies. The above-described background concerning deficiencies of current designs for user cooperation is merely intended to provide an overview of some of the problems of today's designs, and is not intended to be exhaustive. Other problems with the state of the art and corresponding benefits of the invention may become further apparent upon review of the following description of various non-limiting embodiments.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments in a simplified form as a prelude to the more detailed description that follows.

User cooperation is provided for an emerging transmission framework where users act as relays for each other to provide extra diversity paths for better overall performance. In various embodiments, data is transmitted from a basestation to a mobile device in an adaptive communications network including user cooperation. The relaying is performed according to a time division duplex (TDD) system according to either a downlink-assisted relaying (DAR) which performs a relaying operation in a defined supplemental downlink timeslot or according to an uplink-assisted relaying (UAR) which performs a relaying operation in a defined supplemental uplink timeslot.

In exemplary, non-limiting embodiments, relay transmissions are conducted according to a max-throughput scheduling algorithm that achieves a maximum system throughput without imposing any fairness constraints on users or according to a round-robin scheduling algorithm that achieves absolute fairness in terms of delays among the considered users. Further, the downlink throughput can be optimized from the basestation to the mobile device utilizing either amplify-and-forward (AF) or decode-and-forward (DF) cooperation protocols.

BRIEF DESCRIPTION OF THE DRAWINGS

The system and methods for optimizing downlink throughput are further described with reference to the accompanying drawings in which.

DETAILED DESCRIPTION

Overview

Figure 1:
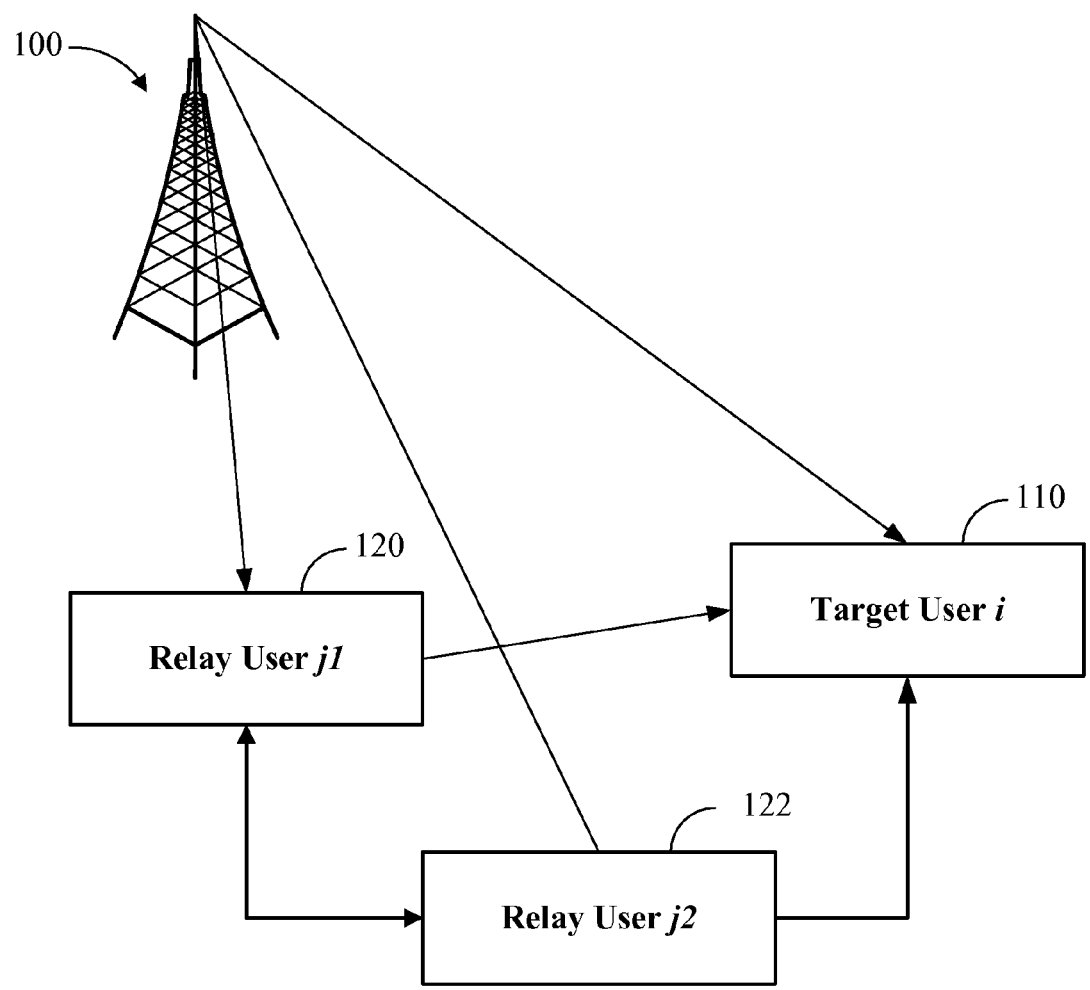
FIG. 1 illustrates a high-level block diagram of a communications system transmitting from a basestation to a user and set of relay users.

As mentioned in the background, user cooperation is an emerging transmission framework where users act as relays for each other to provide extra diversity paths for better overall performance than without the extra diversity paths. However, pre-existing approaches focus only on the physical-layer properties and operations of a fixed pair of source and destination at a particular time instant. Thus, improved scheduling strategies are desired over current user cooperation techniques employed for conventional cellular networks.

In consideration of the deficiencies of the state of the art as described in the background, in various embodiments described herein, downlink throughput is optimized for an adaptive cellular network with both user cooperation and scheduling. Several commonly used cooperation strategies are evaluated under different fairness constraints and the DF protocol is shown not to be able to deliver any capacity gain over its non-cooperative counterpart when users are scheduled for maximizing the overall system throughput.

In another aspect, the placement of relaying timeslots, which directly affects the performance of user cooperation for both adaptive and non-adaptive networks, is investigated over existing frame structures so that user cooperation can be enabled in conventional networks without significant modification. In this regard, multiple relays can be supported in different timeslots concurrently with other transmissions through interference cancellation and scheduling, and the selection of corresponding optimal relays and allocation of optimal power are derived herein.

In one embodiment, a time division duplex (TDD) system is implemented since TDD systems allow a flexible asymmetric downlink-to-uplink assignment ratio that is suitable for future generation wireless systems supporting multimedia services and high-speed data transfers. Estimation of channel state information for the transmitter (CSIT) is also facilitated by exploiting the channel reciprocity that provides highly-rewarding adaptive scheduling and resource allocation.

The downlink throughput can be optimized under two commonly adopted cooperation protocols, AF and DF, with different fairness concerns. The optimal placement of relaying timeslots in conventional frame structure is also determined so that user cooperation can be easily incorporated into existing systems, in contrast to systems where an additional timeslot is dedicated to message relaying. Multiple relay users are considered and the corresponding optimal relay selection and power allocation are derived for a given destination.

In other embodiments described herein, the AF protocol is implemented to achieve a capacity gain when fairness is not considered and users are scheduled for achieving the maximum theoretical system throughput, though it is shown that such gain is marginal and benefits mainly distant users. Instead, in another embodiment, the system throughput of a simple round-robin scheduling algorithm is implemented, which maintains absolute fairness in terms of delay and demonstrates a significant improvement approaching that of the non-cooperative approach aiming at maximizing the system throughput when users of comparable average channel gains are considered.

FIG. 1 is an exemplary non-limiting block diagram illustrating a basestation 100 for transmitting data to a mobile device 110, i.e., target user, including user cooperation in an adaptive communications network. With relay users 120, 122, etc., data can reach target user 110 either directly from basestation 100 or indirectly via relay users 120, 122, etc. Various embodiments of the transmission of data in accordance with optimized downlink throughput with user cooperation and scheduling are now further described with respect to various methodologies elaborated upon below.

Figure 2:
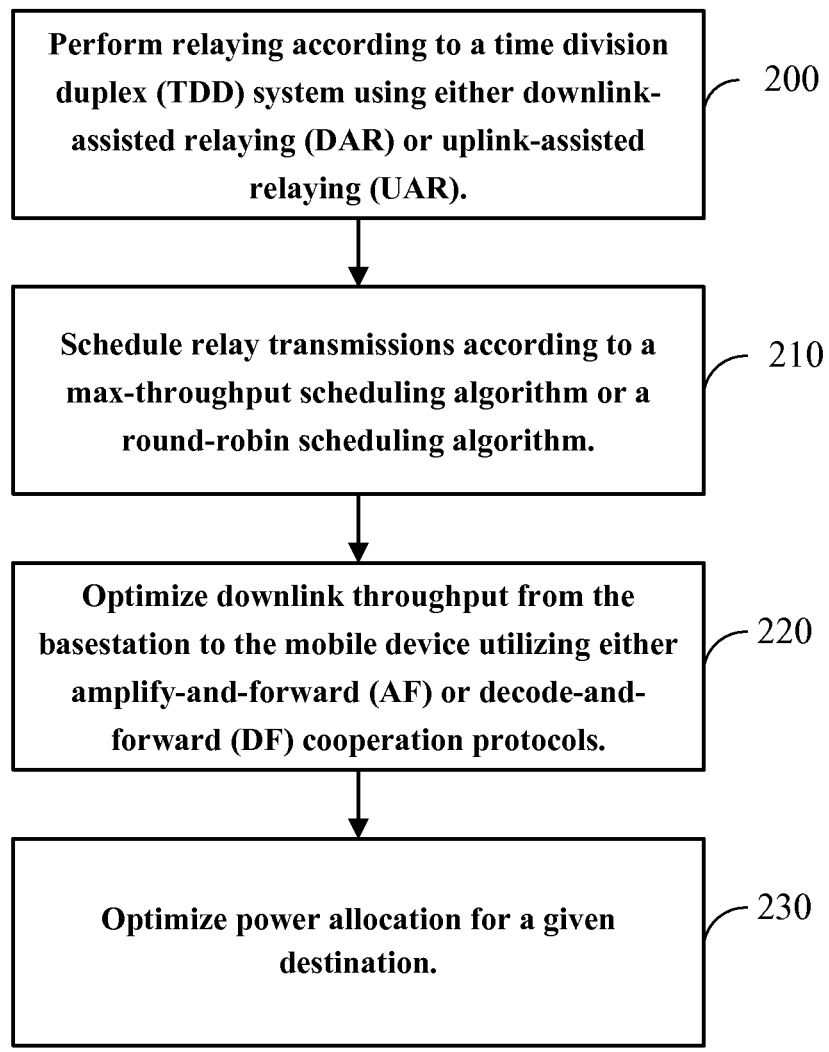
FIG. 2 is a flowchart of an exemplary non-limiting method of optimizing downlink throughput for a communications system.

FIG. 2 is an exemplary non-limiting flow diagram illustrating aspects of processes for transmitting data from a basestation to a mobile device including user cooperation in an adaptive communications network. In no particular order, at 200, relaying is performed according to a time division duplex (TDD) system. As described in more detail below, either downlink-assisted relaying (DAR) is performed, which performs a relaying operation in a defined supplemental downlink timeslot, or uplink-assisted relaying (UAR) is performed, which performs a relaying operation in a defined supplemental uplink timeslot. At 210, relay transmissions are scheduled either according to a max-throughput scheduling algorithm, which achieves a maximum system throughput without imposing any fairness constraints on users, or according to a round-robin scheduling algorithm, which achieves absolute fairness in terms of delays among the considered users. At 220, downlink throughput from the basestation to the mobile device is optimized utilizing either AF or DF cooperation protocols. At 230, power allocation is optimized for a given destination.

As a roadmap for the more detailed description that follows, mathematical models and properties of the cooperation protocols are first described. Then, the placement of relaying timeslots in a frame and the impacts of scheduling algorithms are investigated. Next, optimal relay selection and power allocation algorithms are derived and set forth. Further, performance evaluation and discussions are given to show the benefits of the various embodiments described herein and lastly, some exemplary, non-limiting operating environments and apparatus that can employ the techniques for optimizing downlink throughput are described.

Cooperation Protocols

With respect to cooperation protocols, for supplemental context, the mathematical models of the AF and DF protocols and their properties are now described. As a note, orthogonal relay channels are assumed available at this stage for the multiple-relay scenario that will be discussed in more detail below. In the following, the basestation S transmits a message $x_i$ at power $P_S$ to the target user i and the relay user j in the first timeslot. In the second timeslot, the relay user j will forward its received message copy $\hat{x}_{j,i}$ at power $P_j^{(R)}$ to user i. If there are more relay users, they will forward sequentially their received message to user i in the next timeslots in the same way. The received signals by user i in the first (direct path) and second (relay path) timeslots are characterized by $$(S-i) y_i = \sqrt{|h_i|^2 P_S} x_i + n_i \qquad \text{Eqn. 1}$$

$$(S-j-i) y_{j,i} = \sqrt{|h_{j,i}|^2 P_j^{(R)}} \hat{x}_{j,i} + n_{j,i} \qquad \text{Eqn. 2}$$

where $h_i$ and $h_{j,i}$ capture the equivalent fading, including both large-scale and small-scale fading, experienced by the direct path (S–i) and inter-user (S–j–i) channels. $n_i$ and $n_{j,i}$ are the background additive white Gaussian noise (AWGN) terms with variance $N_o/2$ per complex dimension.

In the AF protocol, $\hat{x}_{j,i}$ in Eqn. 2 is normalized by $$\hat{x}_{j,i} = (\sqrt{|h_j|^2 P_S} x_i + n_j) / \sqrt{|h_j|^2 P_S + N_o}. \qquad \text{Eqn. 3}$$

Equivalently, Eqn. 2 can be expressed as $$y_{j,i} = \sqrt{|h_{j,i}|^2 P_j^{(R)}} \sqrt{\frac{SNR_j}{SNR_j + 1}} x_i + \sqrt{|h_{j,i}|^2 P_j^{(R)}} \frac{1}{\sqrt{SNR_j + 1}} \hat{n}_j + n_{j,i} \qquad \text{Eqn. 4}$$

where $SNR_j$ specifies the received signal-to-noise ratio (SNR) of the (S–j) basestation-relay channel and $\hat{n}_j$ is a normalized AWGN term. From Eqn. 4, the SNR of the relayed path (S–j–i) can then be expressed as $$SNR_{j,i}^{(R)} = \frac{SNR_{j,i}(a_j)}{SNR_{j,i}(1-a_j)+1} = \frac{SNR_j(b_{j,i})}{SNR_j(1-b_{j,i})+1} \quad \text{Eqn. 5}$$

where $$0 < a_j = \frac{SNR_j}{SNR_j+1} < 1 \text{ and } 0 < b_{j,i} = \frac{SNR_{j,i}}{SNR_{j,i}+1} < 1.$$

Therefore, the SNR of the relayed path is upper-bounded by $$0 < SNR_{j,i}^{(R)} < \min(SNR_j, SNR_{j,i}) \quad \text{Eqn. 6}$$

which essentially specifies the bottleneck of the protocol. In general, when multiple relays are used, the relayed paths and the direct path can be combined using maximum-ratio combining (MRC) and the equivalent SNR of the AF protocol is therefore $$(AF): SNR_i^{equiv.} = SNR_i + \sum_{\substack{j=1,\\j \neq i}}^{K} \rho_{j,i} SNR_{j,i}^{(R)} \quad \text{Eqn. 7}$$

in a K-user system with $\rho_{j,i}=1$ referring to the case where user j acts as a relay for user i and $\rho_{j,i}=0$ otherwise.

In the DF protocol, the relay users first attempt to decode the message. On successful decoding, the relays will re-encode the message and then forward it to the destination user. Otherwise, no messages are relayed. The equivalent SNR can be derived from Eqn. 7 by letting $SNR_j=\infty$ if $SNR_j \geq SNR_i$ and $SNR_j=0$ otherwise. That is, $$(DF): SNR_i^{equiv.}(R_i^{target}) = \quad \text{Eqn. 8}$$
$$SNR_i + \sum_{\substack{j=1,\\j \neq i}}^{K} I(SNR_j > SNR(R_i^{target})) \rho_{j,i} SNR_{j,i}$$

where I(.) is an indicator function and $SNR(R_i^{target})$ refers to the minimum receive SNR required for supporting the target rate $R_i^{target}$. We note that the actual throughput of the DF protocol may be smaller than that corresponding to the equivalent SNR specified in Eqn. 8. Additional details regarding the AF and DF protocols may also become apparent upon reviewing the description pertaining to the various embodiments discussed below.

Downlink Throughput Optimization

As mentioned, in one aspect, the subject disclosure pertains to the optimization, or a good placement, of relaying timeslots in a conventional frame structure so that existing networks can benefit from user cooperation without modifying their current frame structure. Then, the optimization of downlink throughput is presented with different fairness concerns under the AF and DF cooperation protocols. In various embodiments, a synchronous and half-duplex TDD network is assumed where downlink and uplink timeslots are typically allocated in bursts with a guard interval of at least the worst-case round-trip delay placed between the two types of timeslots.

With respect to the placement of relaying timeslots, timeslot-splitting relaying (TSR) 300 can be adopted for exploiting user cooperation and is described with reference to FIG. 3 including timing for communications among a basestation 302, a destination user 304 and a relay user 306. Instead of using another full timeslot for the relaying purpose, the slot is split into two sub-slots where the source transmits in the first one and the relay 310 in the second one. However, due to path delay among users in a cellular network, there is still partial interference 312 between the adjacent timeslots, as illustrated. Complete elimination of interference 312 is only possible if extra guard intervals are introduced.

In an adaptive transmission system where CSIT is available, there are other more efficient ways of achieving user cooperation where a higher cooperation gain is delivered without introducing extra overhead and without modifying the original frame structure. Conventional systems that can accommodate cooperative protocols can incorporate the techniques described herein. Furthermore, two more potential placements of the relaying timeslots are also investigated. One of them performs the relaying operation in a new downlink timeslot while the other one performs the relaying operation in an uplink timeslot. The relaying operations involve various degrees of interference cancellation at the destination device of any coexisting transmissions. For convenience, the previous method is referred to herein as downlink-assisted relaying (DAR) and the second one as uplink-assisted relaying (UAR).

Figure 4:
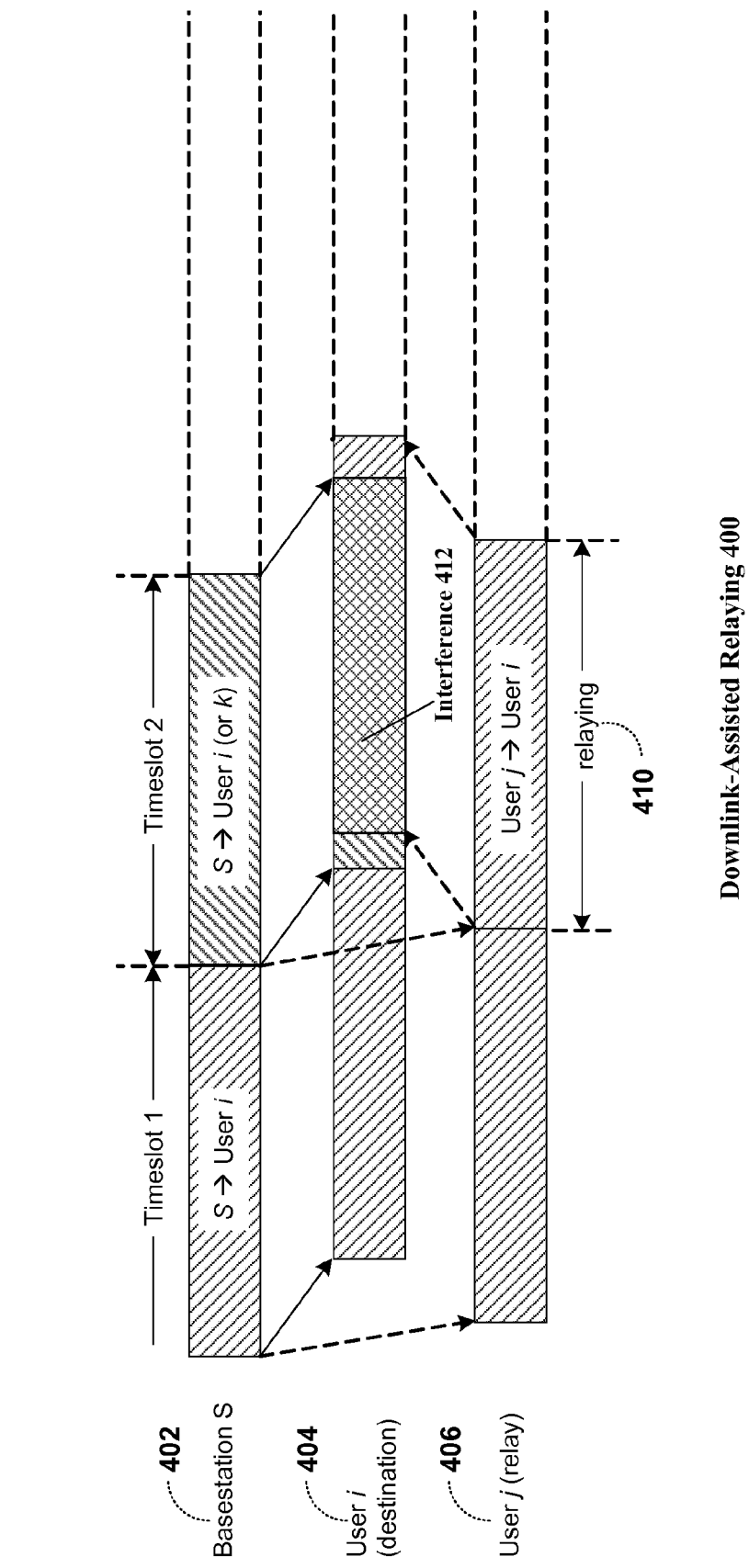
FIG. 4 illustrates various aspects of communications employing downlink-assisted relaying according to various embodiments.

FIG. 4 illustrates exemplary timing for DAR communications 400 among a basestation 402, a destination user 404 and a relay user 406. The relaying 410 of DAR 400 results in interference 412, as illustrated, where relaying is performed in a specifically defined downlink timeslot.

Figure 5:
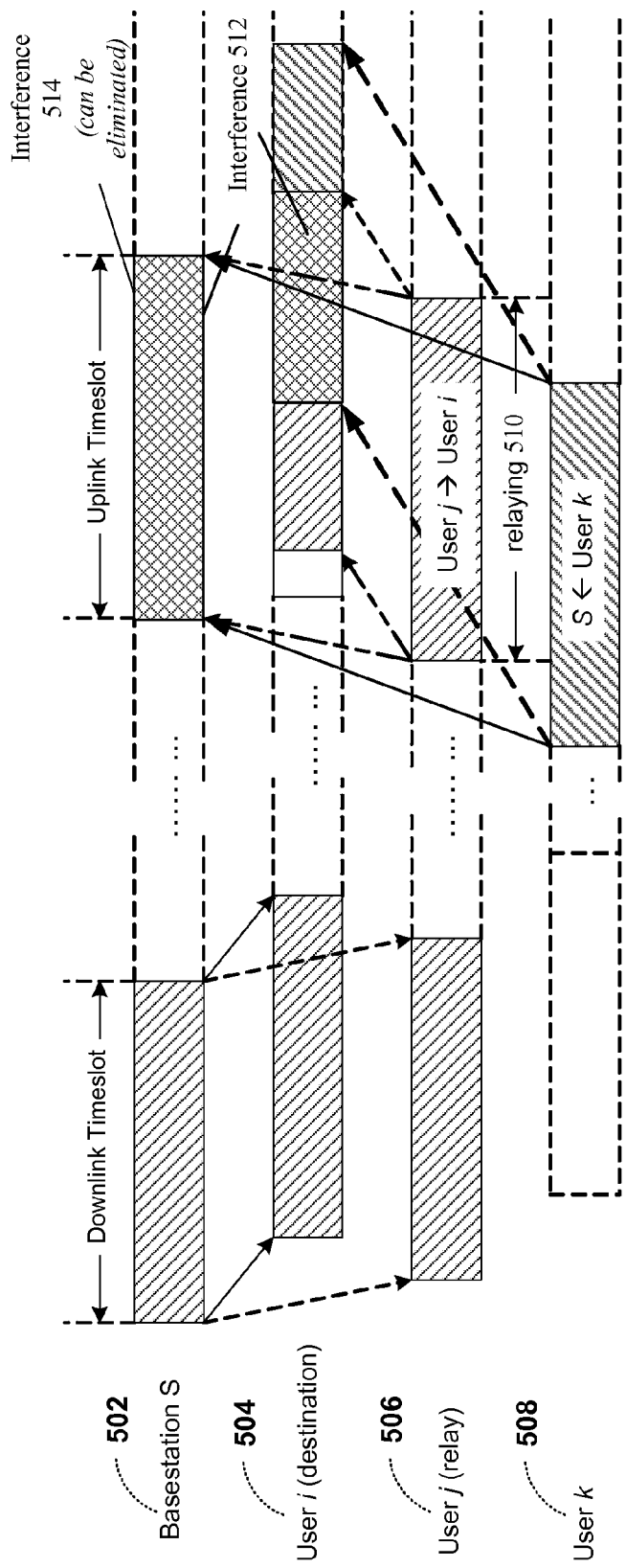
FIG. 5 illustrates various aspects of communications employing uplink-assisted relaying according to various embodiments.

FIG. 5 illustrates exemplary timing for UAR communications 500 among a basestation 502, a destination user 504 and a relay user 506. The relaying 510 of UAR 500 is performed in a specifically defined downlink timeslot. While UAR 500 results in two sets of interference 512, 514, as illustrated, as described in more detail below, interference 514 can be eliminated with optimal scheduling.

Figure 3:
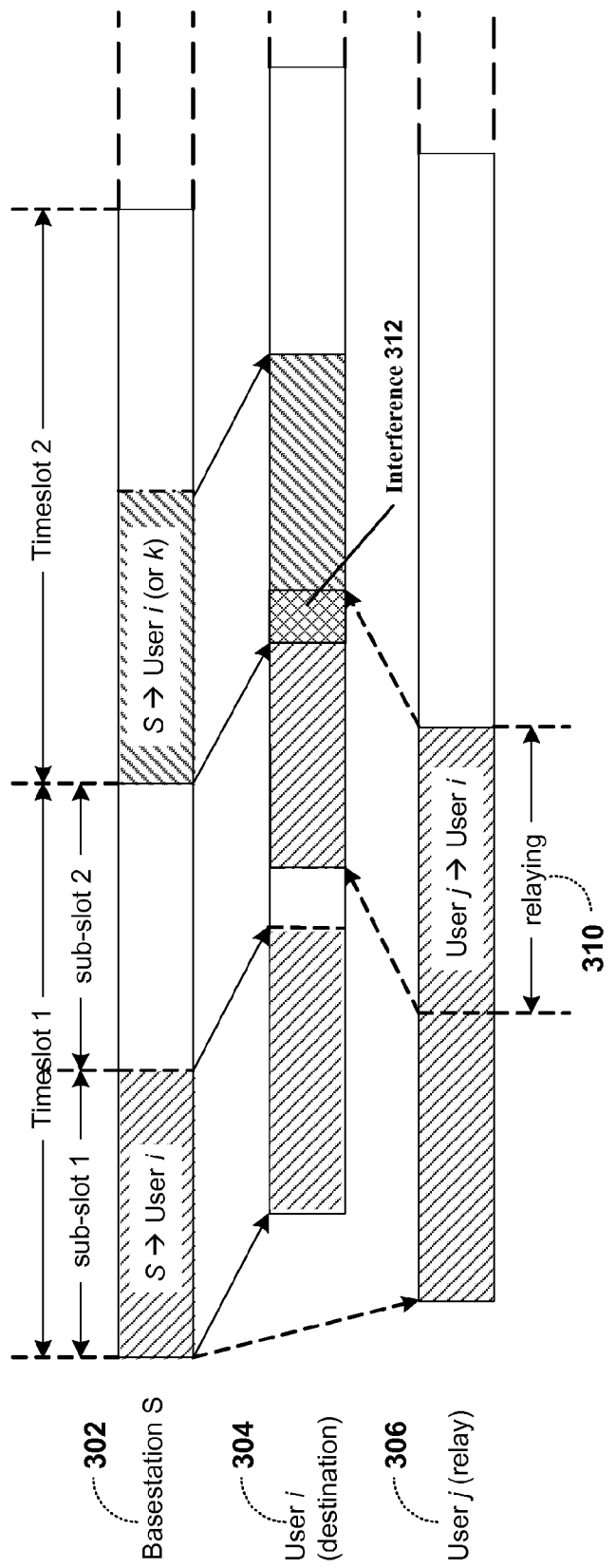
FIG. 3 illustrates various aspects of communications employing conventional timeslot splitting relaying according to various embodiments described herein.

For comparison of FIGS. 3-5, UAR provides a higher net capacity gain than TSR and DAR in TDD networks with CSIT. These concepts can be further divided into three parts that include isolated cooperation gain, interferences imposed on other concurrent transmission by the relay and interferences caused to the relayed message by other concurrent transmission.

Isolated cooperation gain is defined as the pure gain achieved by the three candidates without taking into consideration their costs (interferences). Since UAR and DAR utilize a full timeslot instead of only a half in TSR, both of them achieve superior performance gain compared to the TSR. This is characterized by $$\log(1 + SNR_i^{equiv}) \geq \frac{1}{c}\log(1 + cSNR_i^{equiv}) \quad \text{Eqn. 9}$$

where c is the number of sub-slots a timeslot is divided into for a general TSR strategy.

As mentioned, FIGS. 3, 4 and 5 illustrate three potential relaying timeslots positions for comparison with one another:

conventional timeslot-splitting relaying (TSR), downlink-assisted relaying and uplink-assisted relaying, respectively.

With respect to interferences to concurrent transmissions, as shown in FIG. 3, TSR 300 is observed to possess an advantage as it only causes partial interference to the adjacent timeslot. In contrast, at first glance, UAR 500 appears to perform less well than the other two. However, as discussed below, this does not reflect the whole picture and generally, UAR 500 performs the best among all three strategies.

Considering the DF protocol and the UAR strategy 500 as illustrated in FIG. 5, in the interfered uplink timeslot, the relay user j 506 forwards the message $x_i$ to the destination user i 504. At the same time, another user k 508 transmits its own uplink message $x_k^{UL}$ to the basestation S 502. The received message at the basestation 502 is given by:

$$y_k^{UL} = \sqrt{|h_k|^2 P_k} x_k^{UL} + g(\sqrt{|h_j|^2 P_j^{(R)}} x_i) + n_S \qquad \text{Eqn. 10a}$$

where $g(\sqrt{|h_j|^2 P_j^{(R)}} x_i)$ represents the interference received from user j 506 on user k 508's message. By constraining the relaying operation to be synchronous to the frame timing, $g(\sqrt{|h_j|^2 P_j^{(R)}} x_i)$ can simply be represented by $\sqrt{|h_j|^2 P_j^{(R)}} x_i$. Since $x_i$, $h_j$ and $P_j^{(R)}$ are known at the basestation, the interference can be eliminated, resulting in an interference-free received message for user k 508:

$$y_k^{UL} = \sqrt{|h_k|^2 P_k} x_k^{UL} + n_S \qquad \text{Eqn. 10b}$$

Even if the AF protocol is used, the interference can still be eliminated but with a small extra noise term left in user k 508's received message. For TSR and DAR, in general, the received downlink message at destination user k can be represented in the same form as:

$$y_k^{DL} = \sqrt{|h_k|^2 P_S} x_k + g(\sqrt{|h_{j,k}|^2 P_j^{(R)}} x_i) + n_k \qquad \text{Eqn. 11}$$

where $g(\sqrt{|h_{j,k}|^2 P_j^{(R)}} x_i)$ represents the resultant partial interference after some filtering process converting the received analog messages into the digital domain. As user k does not have the information of $x_i$, $P_j^{(R)}$ and $h_{j,k}$, the interference cannot be eliminated. However, with proper scheduling, signaling and introduction of a guard interval, the missing information can be obtained by user k and a similar interference cancellation technique can be adopted in DAR as well.

A similar situation applies to the AF protocol. In FIGS. 3 and 4, a special case is shown where user i suffers self-interference from its own previous downlink message relayed by user j. However, by scheduling a different user in the consecutive timeslot who is far away from the previous one, the interference can be significantly reduced by the large-scale fading such as path loss.

With respect to interferences from concurrent transmissions, only the UAR scheme reduces the interferences significantly through careful scheduling where the selected concurrent uplink user is far away from the destination user who is receiving messages from its relay. In TSR and DAR, the concurrent transmissions are from the basestation S instead, which has an omnidirectional transmission. Therefore, the interference is reduced by adjusting the basestation transmit power, essentially limiting the coverage of any coexisting transmission.

The three scenarios discussed above, TSR, DAR and UAR are summarized in Table 1 below. By considering the three properties above, UAR is shown to be a good candidate for its high cooperation gain, minimal interference to concurrent transmissions for whatever relay transmit power levels, and negligible interferences from other users through scheduling. In essence, this implies that multiple orthogonal relay channels using full timeslots can be achieved through UAR in a TDD network with CSIT available.

TABLE 1

Comparison of the Three Potential Relaying Timeslots Positions

| | | Interferences | |
|---|---|---|---|
| | Cooperation Gain | to concurrent transmission | to relayed message |
| Timeslot-Splitting Relaying | Low | Partially, significantly improved by scheduling | Partially, improved by scheduling |
| Downlink-Assisted Relaying | High | largely improved by scheduling | Severe, improved by scheduling |
| Uplink-Assisted Relaying | High | Completely eliminated (with a small extra noise term for AF) | Largely improved by scheduling |

With respect to downlink throughput maximization, two extreme scheduling algorithms to be used with the AF and DF protocols are considered. The first one achieves the maximum system throughput without imposing any fairness constraints on users and will be referred to as max-throughput scheduling. The second one is the round-robin strategy, which instead achieves absolute fairness in terms of delays among the considered users. As shown below in additional detail, the round-robin scheduling algorithm and the AF protocol form together a simple and powerful strategy for providing good system throughput while maintaining fairness among users in terms of delay.

With respect to a "without fairness" constraint, although the DF protocol can achieve a higher receive SNR through cooperation as shown in Eqn. 8, the protocol does not deliver any capacity gain when maximum system throughput is considered without fairness concern. The following theorem and proof is now presented.

Theorem 1: DF cooperation achieves the same maximum system throughput as its non-cooperative counterpart when users are scheduled to maximize the system throughput in any operating SNR region.

Proof: Let $R(SNR) = \log(1+SNR)$ be the maximum achievable rate of a link given an SNR. Define $\Phi_i = \{\phi_n^{(i)} : \rho_{j,i}=1\ \forall j \in \phi_n^{(i)}, \rho_{j,i}=0\ \forall j \notin \phi_n^{(i)}\}$ to be the set of relay assignment sets with cardinality $|\Phi_i|=2^{K-1}-1$ for destination user i. Eqn. 8 states that cooperation gain is possible only if $SNR_j > SNR(R_i^{target})$ for some j, or equivalently, $$R_i^{target} \leq \max_{\{j \in \phi_n^{(i)}\}} R(SNR_j)$$

for any given $\phi_n^{(i)}$, which further implies that the maximum rate $R_i^{DF}$ achieved by the DF protocol for user i is upper-bounded by $$R_i^{DF} \leq \max_{\phi_n^{(i)}\text{'s}} \left\{ \max_{\{j \in \phi_n^{(i)}\}} \{R(SNR_i), R(SNR_j)\} \right\} = \qquad \text{Eqn. 12}$$

$$\max_{\{j=\{1,\ldots,K\}\}} R(SNR_j) \forall i \in \{1, \ldots, K\}$$

From Eqn. 12, it is clear that the maximum achievable system throughput of the DF protocol is $$R^{DF} = \max_{i \in \{1,\ldots,K\}} (R_i^{DF}) = \max_{\{j=\{1,\ldots K\}\}} R(SNR_j), \quad \text{Eqn. 13}$$

which is the same as that in a non-cooperative network.

Unlike the DF, the AF protocol always provides a cooperation gain because message detection is done only after combining the signals received from both the direct and relayed paths. The maximum system throughput is achieved when the equivalent SNR in Eqn. 7 is maximized. That is, the problem can be formulated as $$\max_i SNR_i^{equiv.}. \quad \text{Eqn. 14}$$

Since the number of system users is often larger than the number of orthogonal relay channels available, $SNR_i^{equiv.}$ needs to be further optimized. Relay selection and power allocation needs to be performed which will be detailed in the next sub-section.

With respect to a "with fairness" constraint, or round-robin, the maximum system capacity is achieved for round-robin scheduling when the equivalent SNR in Eqn. 7, given a target user i, is maximized. As mentioned above, in a multiuser system, it is likely that the number of users will be larger than the number of total available orthogonal relay channels. Therefore, relays selection is appropriate, as well as, power allocation over the relay channels. In the following, we focus on the AF protocol and derive the optimal relay selection and power allocation strategy for a given target user i with N orthogonal relay channels in total and every potential relay user is allowed to occupy at maximum all the channels. The optimization for the DF protocol is a special case of the AF protocol where $a_j=1$ in Eqn. 5 and the problem is then reduced to a simple one. In the following, m will be used to specify the index of a relay channel.

The following illustrates optimal relay selection and power allocation in accordance with exemplary, non-limiting embodiments.

Let $$f_{j,i}^m(P_j^{(R),m}) = \frac{SNR_{j,i}^m(a_j)}{SNR_{j,i}^m(1-a_j)+1}$$

which represents the equivalent SNR for the relayed path (S–j–i) in the $m^{th}$ relay channel. The objective can be written as $$\max \sum_{j=1, j\neq i}^{K} \sum_{m=1}^{N} \rho_{j,i}^m f_{j,i}^m(P_j^{(R),m}) \quad \text{Eqn. 15a}$$

subject to $$P_j^{(R),m} \leq P_j^{(peak),m} \ \forall \ j \in \{1, 2, \ldots, K\}/\{i\}, \quad \text{Eqn. 15b}$$
$$m \in \{1, 2, \ldots, N\}$$

$$\sum_{j=1, j\neq i}^{K} \sum_{m=1}^{N} P_j^{(R),m} \leq P^{(R),Total} \quad \text{Eqn. 15c}$$

$$\sum_{j=1, j\neq i}^{K} \rho_{j,i}^m \leq 1 \ \forall \ m \ \text{where} \ \rho_{j,i}^m \in \{0, 1\}. \quad \text{Eqn. 15d}$$

Constraint Eqn. 15b is the individual peak power constraint for user j in relay channel m, which can also be used to control the maximum co-channel interference on other transmissions in the same channel. There is also a total relay power constraint represented by Eqn. 15c. The basestation power is assumed fixed and known, hence, $a_j$ also, and is independent of the power constraint of the mobile users (relays). The knowledge of inter-user channel gains is also assumed at the basestation. In practice, these may be values from a predefined set of channel gain thresholds that are obtained during the initial setup of a cooperating group for a particular target user. Finally, constraint Eqn. 15d states that only a single user is allowed to be a relay for each relay channel.

The problem is in general combinatorial. However, the function $f_{j,i}^m(P_j^{(R),m})$ can be shown to be concave and monotonically increasing. By using a relaxation technique for the parameter $\rho_{j,i}^m$, the problem can be formulated into a convex maximization problem which can be solved with the aid of Lagrangian Multiplier and Karush-Kuhn-Tucker (KKT) conditions. Results are shown herein for the derived optimal user selection and power allocation strategy. This problem is analogous to the capacity maximization problem for a traditional network with parallel channels, however, there is a clear difference in the resulting optimal relay (user) selection strategy.

With respect to optimal relay selection, the optimal user $j^{m*}$ for the $m^{th}$ relay channel is selected according to $$j^{m*} = \arg\max_j H_{j,i}^m(\Omega) \quad \text{Eqn. 16a}$$

where $$H_{j,i}^m(\Omega) = f_{j,i}^m(f_{j,i}^{m'-1}(\tilde{\Omega})) - \tilde{\Omega} f_{j,i}^{m'-1}(\tilde{\Omega}) \quad \text{Eqn. 16b}$$

and $$\tilde{\Omega} = \begin{cases} f_{j,i}^{m'}(P_j^{(peak),m}) & \text{if } f_{j,i}^{m'-1}(\Omega) > P_j^{(peak),m} \\ \Omega & \text{if } 0 \leq f_{j,i}^{m'-1}(\Omega) \leq P_j^{(peak),m} \\ f_{j,i}^{m'}(0) & \text{if } f_{j,i}^{m'-1}(\Omega) < 0 \end{cases} \quad \text{Eqn. 16c}$$

$f_{j,i}^{m'}$ is the derivative with respect to $P_j^{(R),m}$ and $\Omega$ is the common parameter among all the m relay channels to be adjusted such that the total power constraint in Eqn. 15c is satisfied. The larger $\Omega$ is, the smaller the power allocated given a set of selected users.

It is well-known that the optimal user selection strategy for a traditional network maximizing the system capacity can be reduced to choosing the one with the best channel. When individual peak power constraints are imposed, it can be proved that it is optimal to choose the user with the largest rate. However, it can be shown that this is no longer the case for our system with user cooperation where choosing the maximum $f_{j,i}^m(P_j^{(R),m})$ does not achieve the optimal solution.

With respect to optimal power allocation, the optimal power allocation for any set of selected relay users can be shown to be $$P_j^{(R),m^*} = \text{Eqn. 17}$$

$$\left(\frac{\lambda\sqrt{a_j \gamma_{j,i}^m} - 1}{(1-a_j)\gamma_{j,i}^m}\right)^+ = \left(\lambda\sqrt{\frac{SNR_j(SNR_j+1)}{\gamma_{j,i}^m}} - \frac{SNR_j+1}{\gamma_{j,i}^m}\right)^+$$

where $\lambda^2 = \tilde{\Omega}^{-1}$, $(x)^+ = \max(x, 0)$ and $\gamma_{j,i}^m = |h_{j,i}^m|^2/N_o$.

This result is consistent with a pair of source and destination nodes where assisted by a fixed number of relays adopting the TSR approach instead.

Numerical Results and Discussions

In the downlink of a cellular network, the maximum system throughput is often dominated by a few users who are close to the basestation. Therefore, it may not be appropriate to evaluate the effectiveness of a user cooperation protocol under such a measure because any significant improvement for the distant users may amount to only an indistinguishable increase of the overall system throughput. In order to obtain more meaningful results, the performance within a cooperating group in which users are of comparable average channel gains from the basestation is considered.

As mentioned, a TDD system is assumed and the simulation settings are as follows. A cell of radius 1 km is considered and users are uniformly distributed within clusters each of 50 m radius. Every cluster contains 5 users and is evaluated at different distances from the basestation. Identical and independently distributed (i.i.d.) Rayleigh fading is assumed for both the basestation-user and inter-user channels. Path loss exponent is set to 3 in all cases with a reference average power of 30 dB at 100 m from the basestation. In particular, the AF protocol under the two scheduling strategies, max-throughput and round-robin are considered in these results. A quasistatic channel is considered and the peak power for each relay channel is allowed to be the maximum total relay power.

Figure 6:
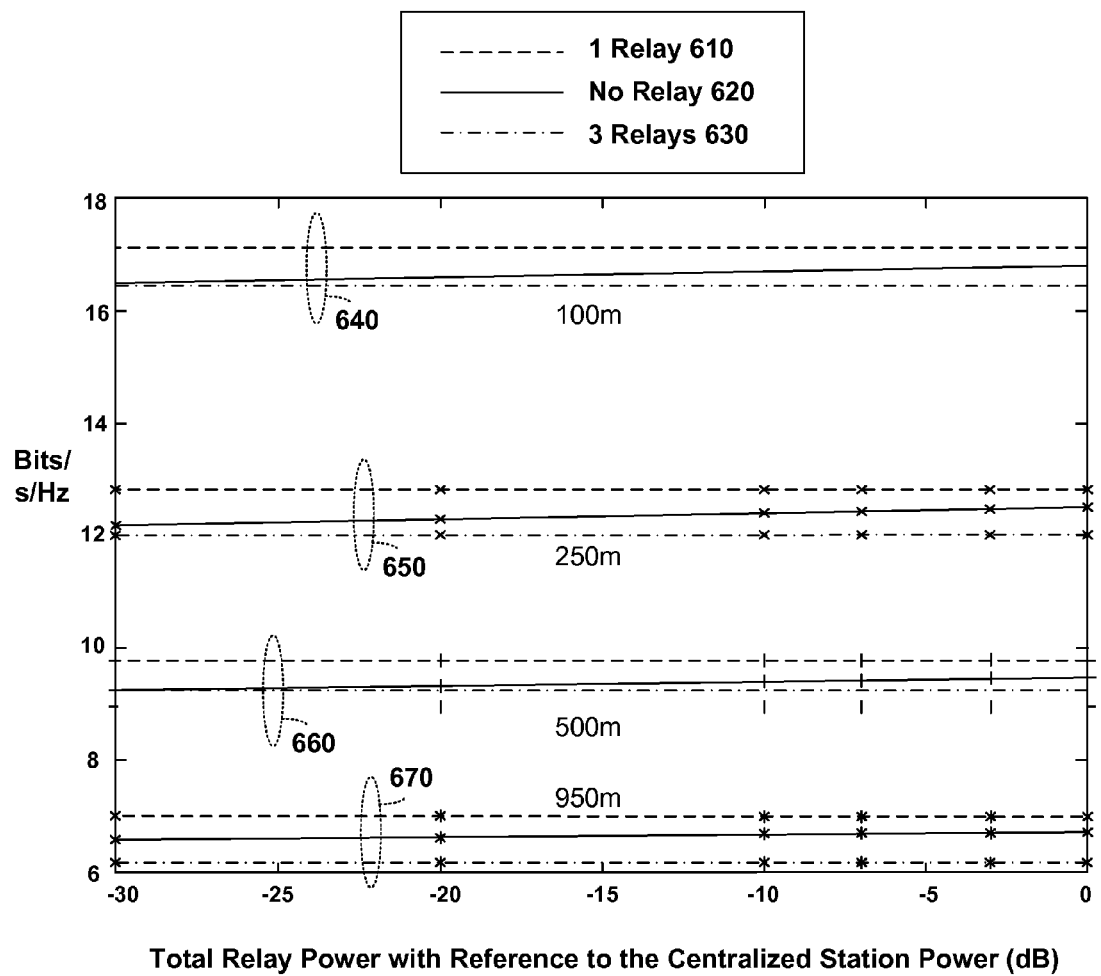
FIG. 6 illustrates various exemplary aspects of using the AF protocol according to various embodiments.

FIG. 6 illustrates max-throughput scheduling 600 for 1 relay 610, no relays 620 and for 3 relays 530. In each case, separate curve clusters 640, 650, 660 and 670 are provided representing users at distances 100 m, 250 m, 500 m and 950 m, respectively. As discussed above, the DF protocol does not achieve gain in the maximum system throughput. However, as illustrated in FIG. 6, the AF protocol also provides only marginal improvement. The gain appears the most significant for the farthest cluster near the cell edge where a throughput gain of ~8% is recorded with 1 relay. Only a small amount of relay power, 20 dB less than the basestation transmit power, is required and increasing further the relay power does not result in any significant improvement. An upper bound of 3 relays is provided as a reference where the inter-user channels are assumed noise-free. In such case, the system is reduced to a single-input-multiple-output (SIMO) system. It can be observed that the potential gain by more relays is also limited and is expected to be the case for ordinary networks, unless an exceptionally densely populated one is considered.

Figure 7:
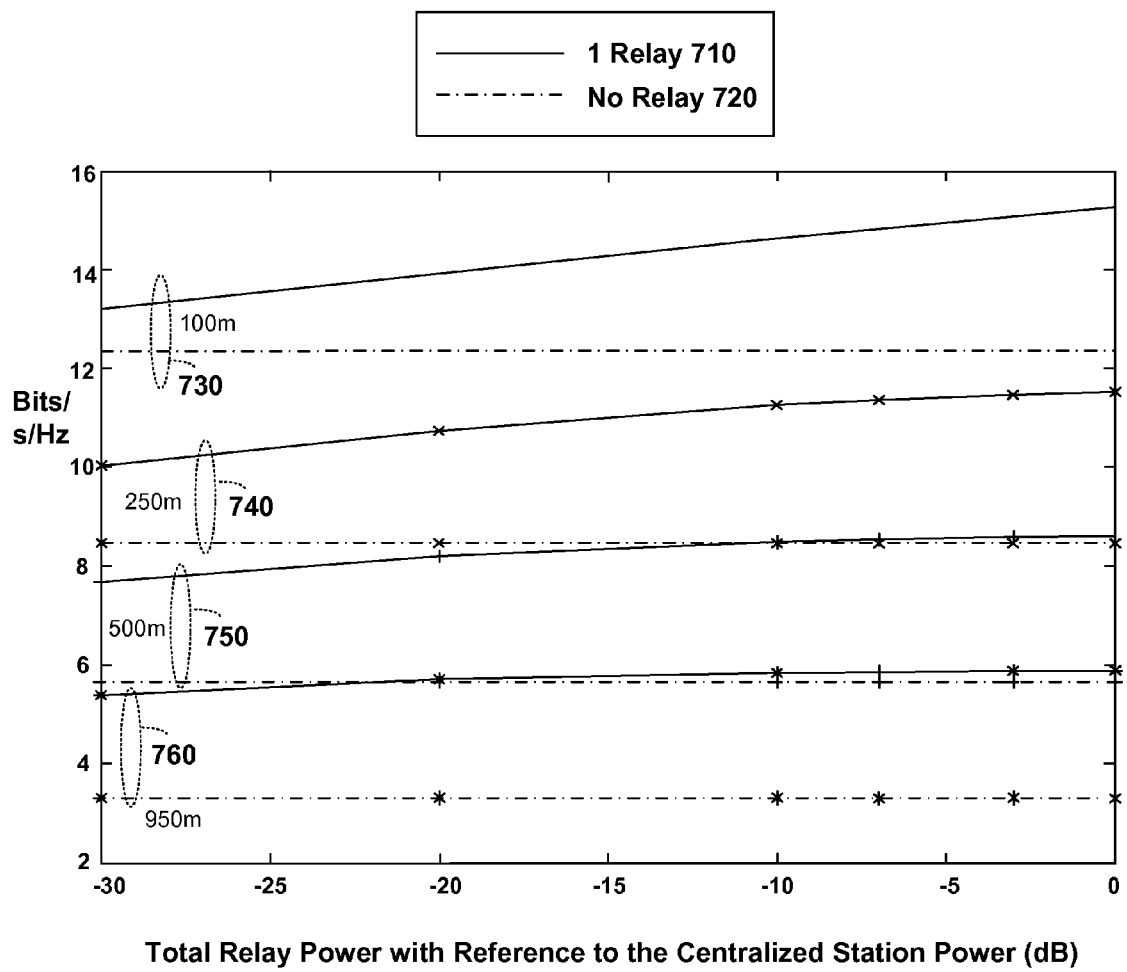
FIG. 7 illustrates various aspects of round-robin scheduling when user cooperation is enabled according to various embodiments.

Round-robin scheduling 700 is shown in FIG. 7 for 1 relay 710 and no relays 720. In each case, separate curve clusters 730, 740, 750 and 760 are provided representing users at distances 100 m, 250 m, 500 m and 950 m, respectively. Round-robin scheduling 700 enables users to transmit under a fair condition where every user has the same percentage share of the channel and same delay, but often at a substantial expense of throughput. FIG. 7 shows that this is no longer the case when user cooperation is enabled. Significant gain in system throughput is achieved with only 1 relay and limited relay power. For instance, over 70% throughput increase is achieved for the cluster near the cell edge at the expense of only 1% basestation transmission power for the relay. Attractive gain can still be achieved for clusters near the basestation where over 25% gain is obtained for clusters at 250 m and about 10% for the 100 m ones. The capacity gap from the max-throughput scheduling is greatly reduced. There may be occasions where one user is used as relay more frequently. However, since bandwidth is often a bigger issue than power in a cellular network, this short-term fairness should be tolerable while the long-term fairness can still be maintained as channels fluctuate.

Figure 8:
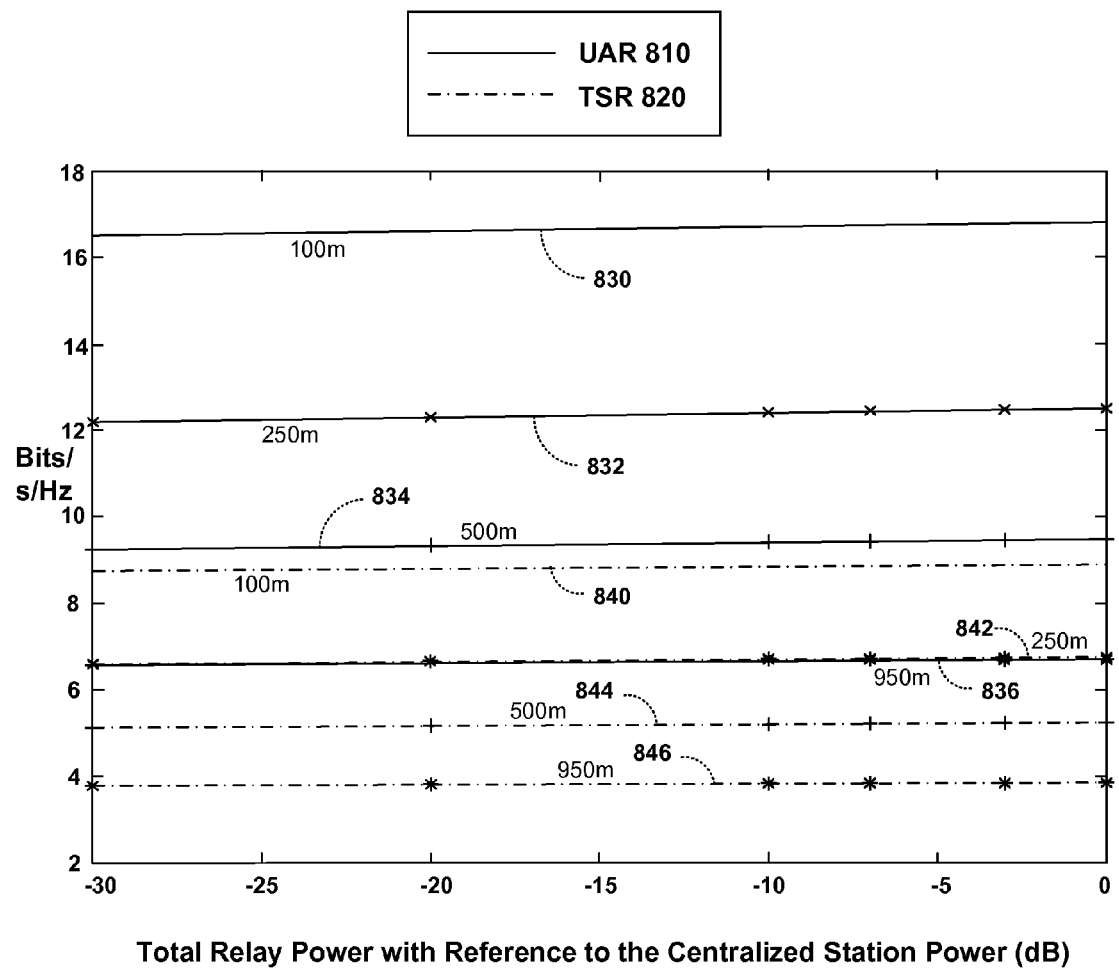
FIG. 8 demonstrates the effect of different placement of relaying timeslots according to different embodiments.

With respect to a comparison between UAR 810 and TSR 820, FIG. 8 demonstrates the effect of different placement of relaying timeslots. At 100 m, curves 830 and 840 represent the UAR and TSR performance, respectively. Similarly at 250 m, 500 m and 950 m, curves 832, 842, curves 834, 844 and curves 846, 846 represent UAR and TSR performance, respectively. It can be observed, for each distance and set of curves, that the UAR approach is significantly better than the TSR one. When max-throughput scheduling is considered, TSR performs even worse than the non-cooperative counterpart, as can be predicted using Eqn. 9.

Figure 9:
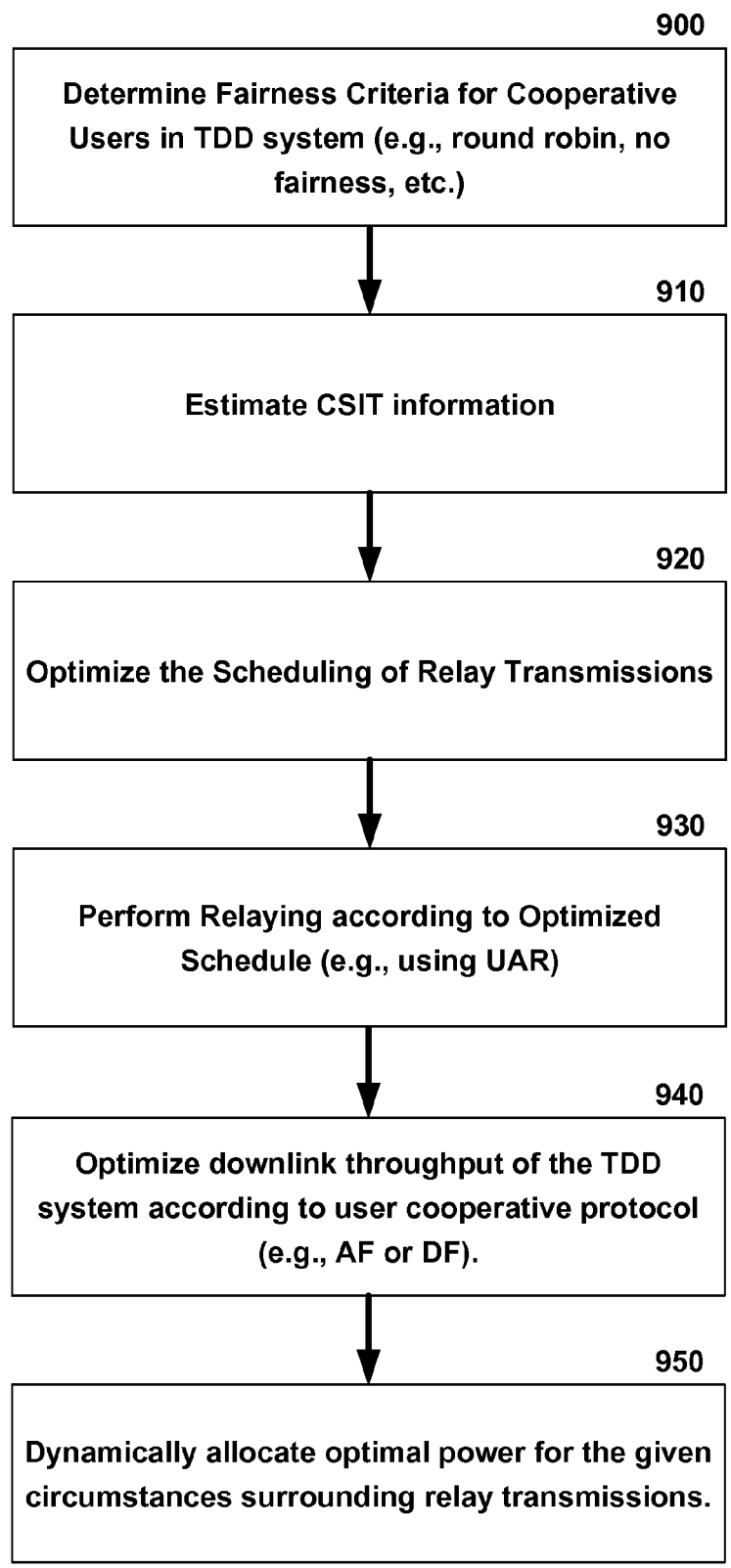
FIG. 9 is a flow diagram of a first, non-limiting representative embodiment for relaying and scheduling according to optimal algorithms.

FIG. 9 is a flow diagram of a first, non-limiting representative embodiment for relaying and scheduling according to optimal algorithms. Not necessarily in any particular order, at 900, for a set of users and relay devices, fairness criteria to be applied to communications to multiple users are determined. Then, CSIT information is determined where available at 910. At 920, based on the fairness scheme applied and CSIT information if available, an optimal relay schedule is formed. At 930, the data relaying occurs using the optimized schedule. In one embodiment, as described above, UAR can be used, as can DAR. At 940, communications occur according to a user cooperative protocol, such as AF or DF whereby downlink throughput is optimized. At 950, power is dynamically allocated for the given circumstances involving device transmissions.

Figure 10:
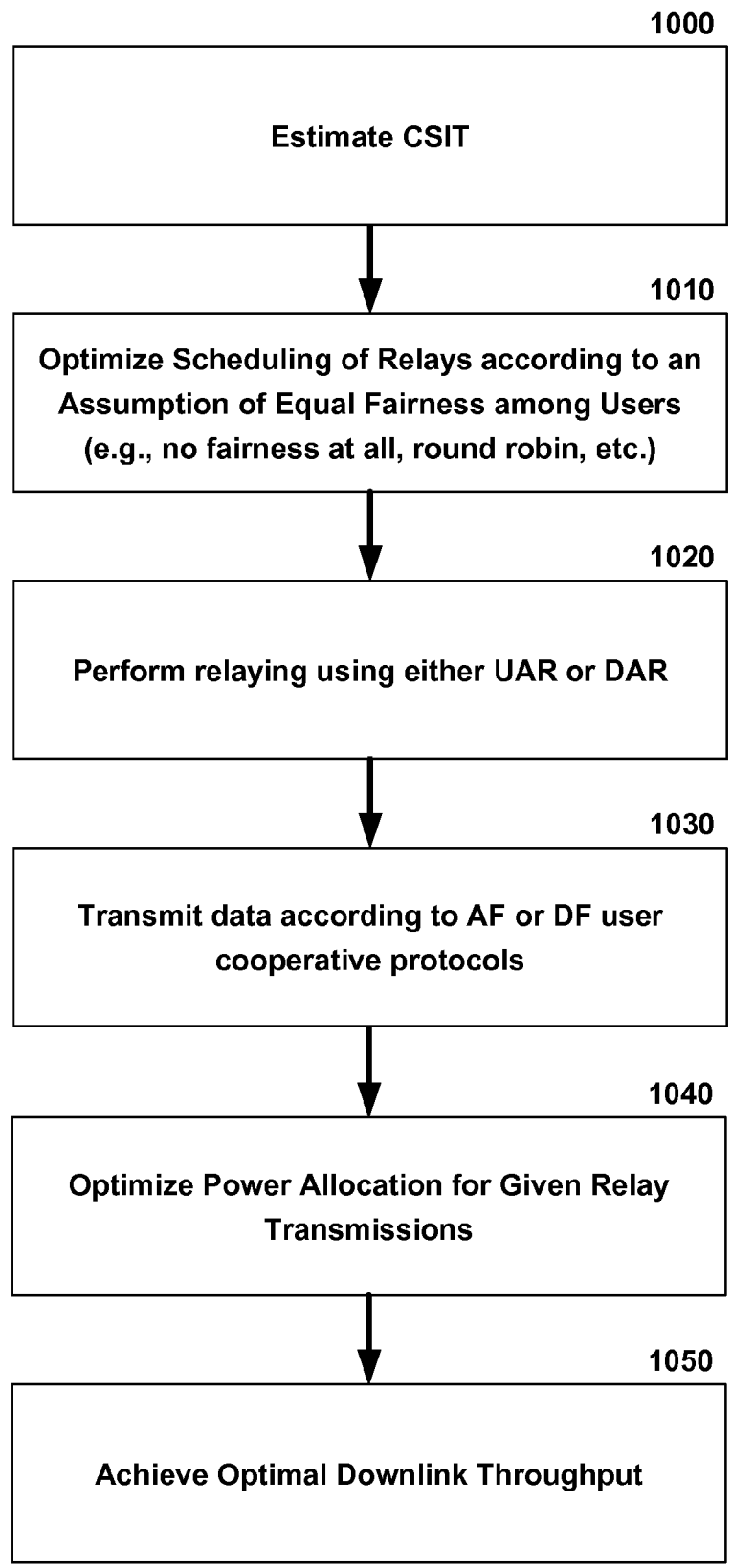
FIG. 10 is a flow diagram of a second, non-limiting representative embodiment for relaying and scheduling according to optimal algorithms.

FIG. 10 is a flow diagram of a second, non-limiting representative embodiment for relaying and scheduling according to optimal algorithms. Again in no particular order, at 1000, CSIT information is estimated or otherwise available. At 1010, an optimal schedule for relay transmissions is generated based upon an assumption of equal fairness among users. For example, a round robin type system can be adopted that treats different users equally in terms of priority, or no fairness constraints can be applied for all users. At 1020, relaying is performed using UAR or DAR. Then, at 1030, data is transmitted either according to the AF user cooperative protocol or the DF user cooperative protocol. Then, at 1040, power is dynamically optimized for the schedule of relay transmissions. At 1050, transmission occurs according to the optimized parameters achieving optimal downlink throughput. Advantageously, the embodiments can be incorporated into existing network frame structures for wireless communications.

Figure 11:
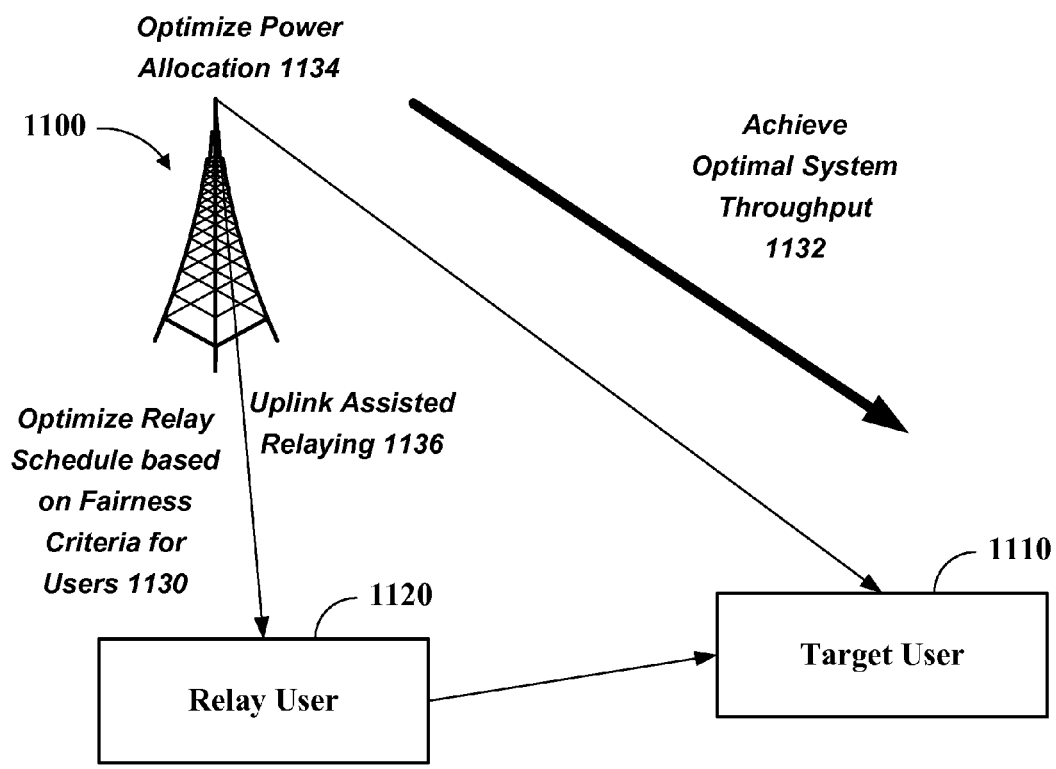
FIG. 11 is a block diagram of an illustrative embodiment for relaying and scheduling according to various embodiments described herein.

FIG. 11 is a block diagram of an embodiment for relaying and scheduling illustrative of some non-limiting aspects of various embodiments described herein. For simplicity of representation, a single relay user 1120 and target user 1110 are shown, though the user cooperative relay techniques described herein can apply to any number of relays and target users. A basestation 1100 is provided for transmitting data to a set of relay devices and a target user device according to a user cooperative protocol, such as AF or DF. In this regard, the basestation 1100 can perform relaying according to either UAR 1136 or DAR (not shown).

The basestation 1100 relays to achieve maximum system throughput 1132 without imposing any fairness constraints on target user devices or according to a round-robin scheduling algorithm, which achieves absolute fairness in terms of delays among target user devices. A relay schedule 1130 is thus optimized based on the fairness considerations and to optimize system throughput, which may include allocating optimal power 1134 for transmissions of the system.

In sum, in various non-limiting embodiments, the downlink throughput optimization problem with user cooperation was investigated. Different from previous works that focused on fixed pairs of source and destination, user scheduling is incorporated with different fairness concerns into the cooperation framework. Two commonly used cooperation protocols, amplify-and-forward and decode-and-forward, were evaluated and some exemplary results were presented.

Specifically, it was demonstrated herein that when users are scheduled for maximizing the system throughput without any fairness constraint, the DF protocol cannot provide any gain in the maximum achievable system throughput compared to its non-cooperative counterpart while the AF protocol always results in an improvement. The placement of relaying timeslots in conventional frame structure was also explored as it directly affected the performance of user cooperation. It was shown that by careful user scheduling, multiple relays could be supported concurrently with other transmissions in different timeslots for adaptive cellular networks with CSIT available. This enables easy incorporation of user cooperation into existing systems without the need of modifying their frame structures.

The corresponding optimal relay selection and power allocation algorithm were derived. Yet, it was demonstrated that only one relay was enough to achieve a significant gain in the downlink throughput for especially the round-robin scheduling algorithm, which is a favorable strategy when combined with user cooperation for maintaining fairness among users in terms of delay without sacrificing the maximum achievable system throughput significantly.

Exemplary Communications Networks and Environments

The above-described optimizations may be applied to any network, however, the following description sets forth some exemplary telephony radio networks and non-limiting operating environments for incorporation of the present invention. The below-described operating environments should be considered non-exhaustive, however, and thus the below-described network architecture merely shows one network architecture into which the present invention may be incorporated. One can appreciate, however, that the invention may be incorporated into any now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and need not depend on any particular network architecture, or underlying protocols, except where specified otherwise.

Figure 12:
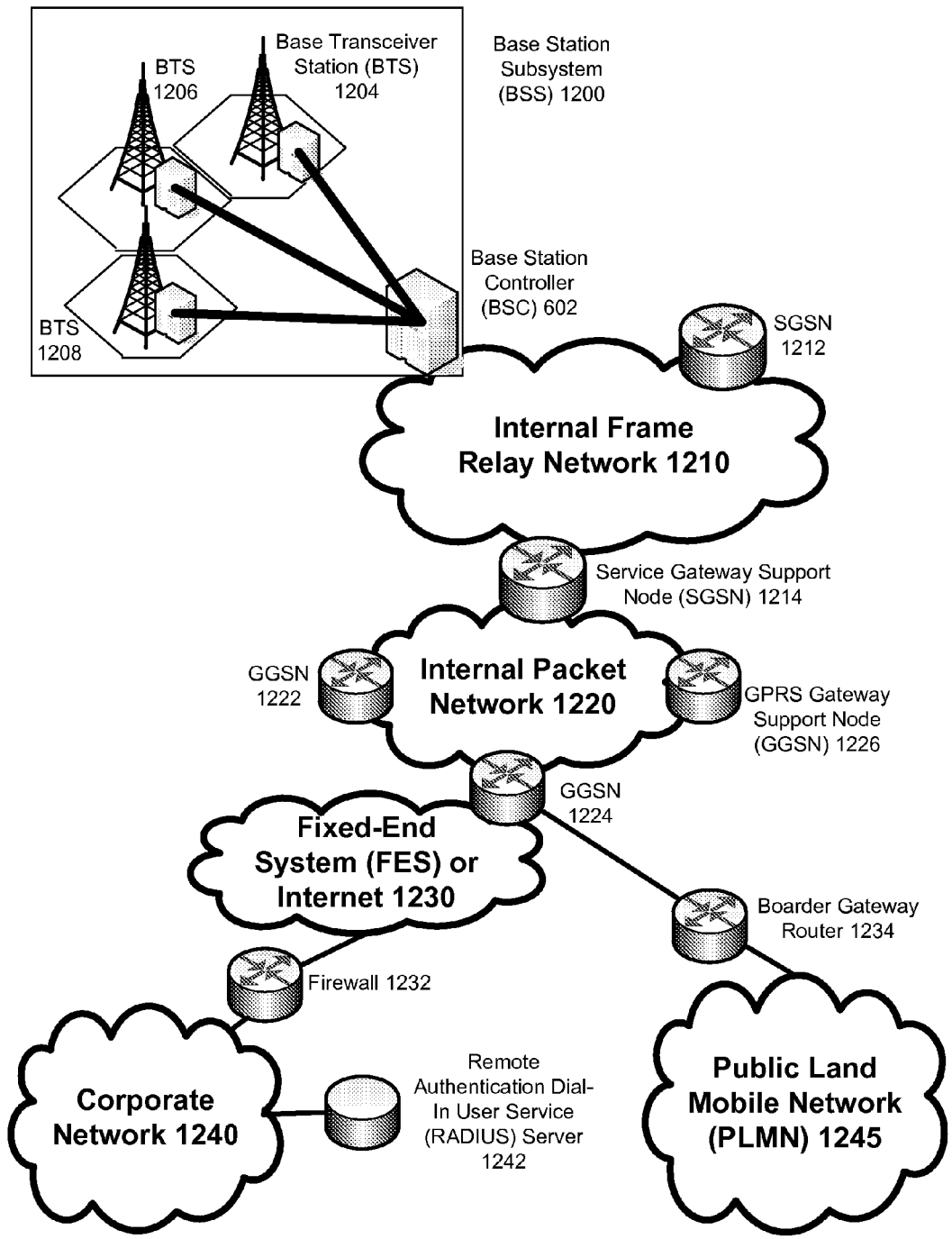
FIG. 12 illustrates an overview of an exemplary, non-limiting network environment suitable for service by various embodiments.

FIG. 12 depicts an overall block diagram of an exemplary packet-based mobile cellular network environment, such as a GPRS network, in which the invention may be practiced. In such an environment, there are a plurality of Base Station Subsystems ("BSS") 1200 (only one is shown), each of which comprises a Base Station Controller ("BSC") 1202 serving a plurality of Base Transceiver Stations ("BTS") such as BTSs 1204, 1206, and 1208. BTSs 1204, 1206, 1208, etc. are the access points where users of packet-based mobile devices become connected to the wireless network. In exemplary fashion, the packet traffic originating from user devices is transported over the air interface to a BTS 1208, and from the BTS 1208 to the BSC 1202. Base station subsystems, such as BSS 1200, are a part of internal frame relay network 1210 that may include Service GPRS Support Nodes ("SGSN") such as SGSN 1212 and 1214.

Each SGSN is in turn connected to an internal packet network 1220 through which a SGSN 1212, 1214, etc. can route data packets to and from a plurality of gateway GPRS support nodes (GGSN) 1222, 1224, 1226, etc. As illustrated, SGSN 1214 and GGSNs 1222, 1224, and 1226 are part of internal packet network 1220. Gateway GPRS serving nodes 1222, 1224 and 1226 mainly provide an interface to external Internet Protocol ("IP") networks such as Public Land Mobile Network ("PLMN") 1245, corporate intranets 1240, or Fixed-End System ("FES") or the public Internet 1230. As illustrated, subscriber corporate network 1240 may be connected to GGSN 1224 via firewall 1232; and PLMN 1245 is connected to GGSN 1224 via boarder gateway router 1234. The Remote Authentication Dial-In User Service ("RADIUS") server 1242 may be used for caller authentication when a user of a mobile cellular device calls corporate network 1240.

Generally, there can be four different cell sizes in a GSM network-macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as clients, servers, mobile devices, or other devices. Those skilled in the art will appreciate that the claimed subject matter can also be practiced with other computer system configurations and protocols, where non-limiting implementation details are given.

Figure 13:
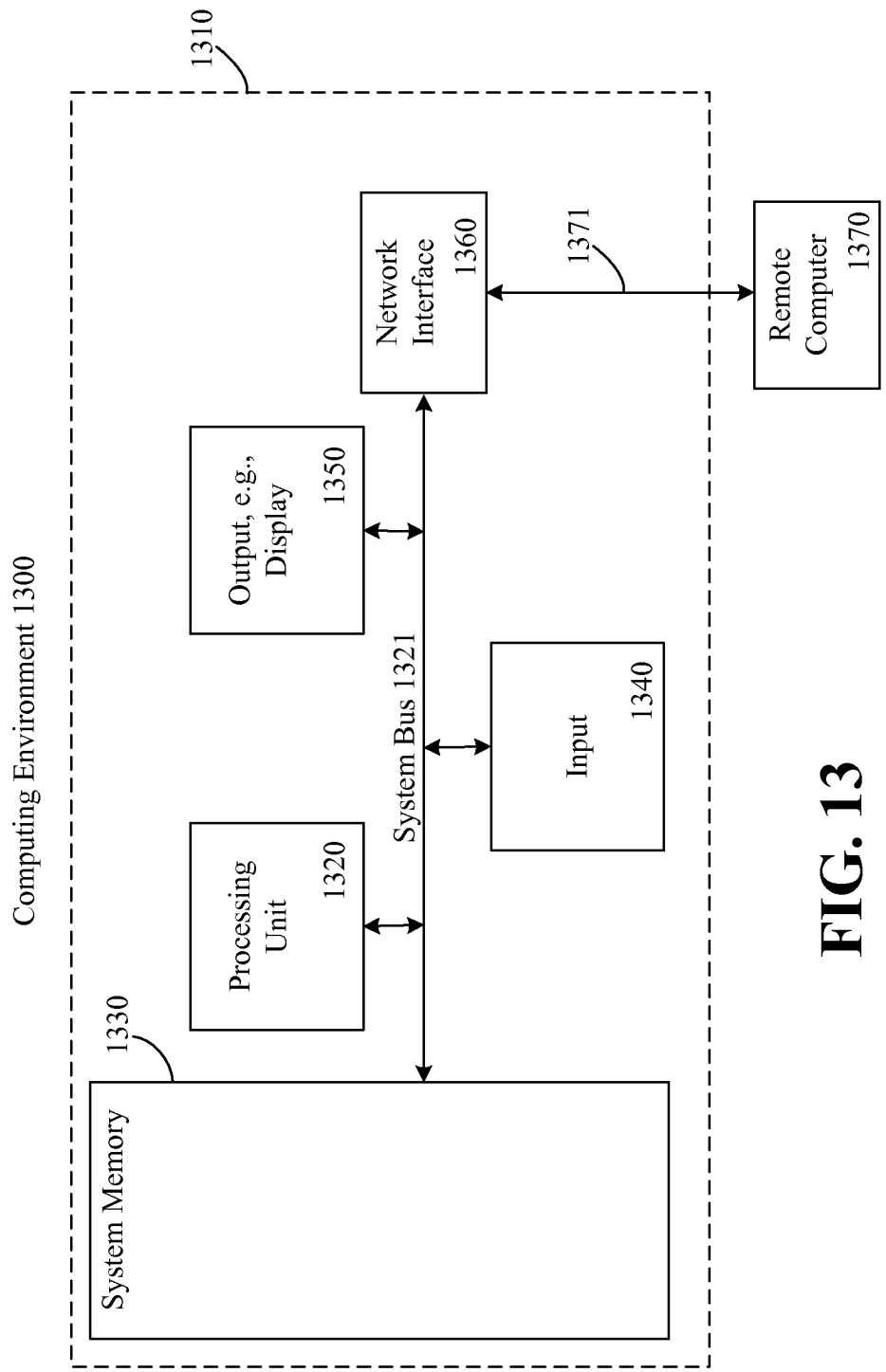
FIG. 13 is a block diagram of an exemplary, non-limiting operating environment in which various aspects described herein can function.
Figure 12:
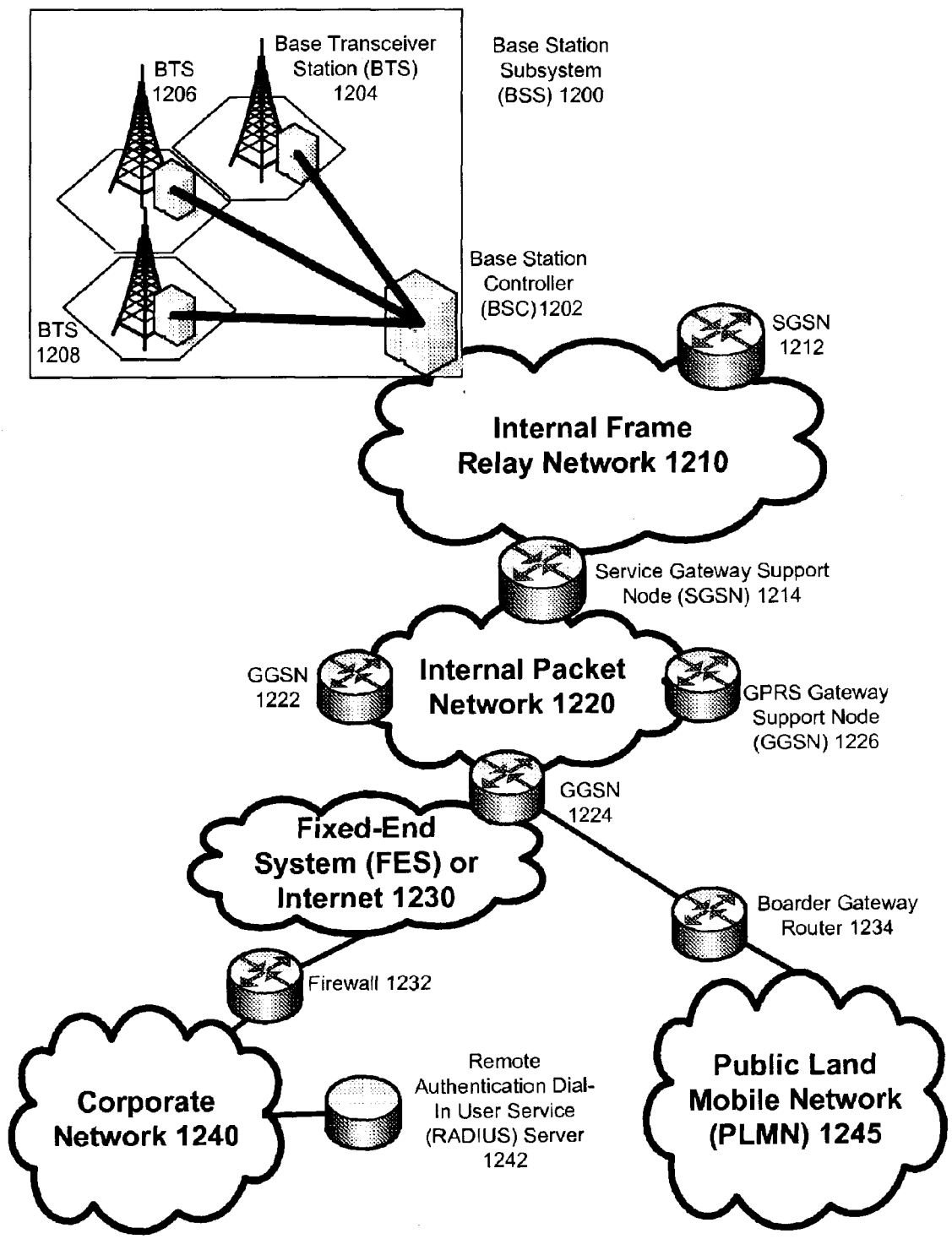

FIG. 13 thus illustrates an example of a suitable computing system environment 1300 in which the claimed subject matter may be implemented, although as made clear above, the computing system environment 1300 is only one example of a suitable computing environment for a media device and is not intended to suggest any limitation as to the scope of use or functionality of the claimed subject matter. Further, the computing environment 1300 is not intended to suggest any dependency or requirement relating to the claimed subject matter and any one or combination of components illustrated in the example operating environment 1300.

With reference to FIG. 13, an example of a remote device for implementing various aspects described herein includes a general purpose computing device in the form of a computer 1310. Components of computer 1310 can include, but are not limited to, a processing unit 1320, a system memory 1330, and a system bus 1321 that couples various system components including the system memory to the processing unit 1320. The system bus 1321 can be any of several types of bus structures including a memory bus or memory controller, a peripheral bus, and a local bus using any of a variety of bus architectures.

Computer 1310 can include a variety of computer readable media. Computer readable media can be any available media that can be accessed by computer 1310. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1310. Communication media can embody computer readable instructions, data structures, program modules or other data in a modulated data signal such as a carrier wave or other transport mechanism and can include any suitable information delivery media.

The system memory 1330 can include computer storage media in the form of volatile and/or nonvolatile memory such as read only memory (ROM) and/or random access memory (RAM). A basic input/output system (BIOS), containing the basic routines that help to transfer information between elements within computer 1310, such as during start-up, can be stored in memory 1330. Memory 1330 can also contain data and/or program modules that are immediately accessible to and/or presently being operated on by processing unit 1320. By way of non-limiting example, memory 1330 can also include an operating system, application programs, other program modules, and program data.

The computer 1310 can also include other removable/non-removable, volatile/nonvolatile computer storage media. For example, computer 1310 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1321 through a non-removable memory interface such as an interface, and a magnetic disk drive or optical disk drive can be connected to the system bus 1321 by a removable memory interface, such as an interface.

A user can enter commands and information into the computer 1310 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1320 through user input 1340 and associated interface(s) that are coupled to the system bus 1321, but can be connected by other interface and bus structures, such as a parallel port, game port or a universal serial bus (USB). A graphics subsystem can also be connected to the system bus 1321. In addition, a monitor or other type of display device can be connected to the system bus 1321 via an interface, such as output interface 1350, which can in turn communicate with video memory. In addition to a monitor, computers can also include other peripheral output devices, such as speakers and/or a printer, which can also be connected through output interface 1350.

The computer 1310 can operate in a networked or distributed environment using logical connections to one or more other remote computers, such as remote computer 1370, which can in turn have media capabilities different from device 1310. The remote computer 1370 can be a personal computer, a server, a router, a network PC, a peer device or other common network node, and/or any other remote media consumption or transmission device, and can include any or all of the elements described above relative to the computer 1310. The logical connections depicted in FIG. 13 include a network 1371, such local area network (LAN) or a wide area network (WAN), but can also include other networks/buses. Such networking environments are commonplace in homes, offices, enterprise-wide computer networks, intranets and the Internet.

When used in a LAN networking environment, the computer 1310 is connected to the LAN 1371 through a network interface or adapter. When used in a WAN networking environment, the computer 1310 can include a communications component, such as a modem, or other means for establishing communications over the WAN, such as the Internet. A communications component, such as a modem, which can be internal or external, can be connected to the system bus 1321 via the user input interface at input 1340 and/or other appropriate mechanism. In a networked environment, program modules depicted relative to the computer 1310, or portions thereof, can be stored in a remote memory storage device. It should be appreciated that the network connections shown and described are exemplary and other means of establishing a communications link between the computers can be used.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A method, comprising:
    selecting a relay device, from a set of candidate relay devices, for relay of data from a basestation device to a destination mobile device based on a determination of a signal-to-noise ratio of a channel between the basestation device and the relay device, wherein the determination is subject to respective peak power constraints for the set of candidate relay devices and a total relay power constraint; and
    initiating the relay of the data from the basestation device to the destination mobile device via the relay device, wherein the initiating of the relay includes initiating an uplink-assisted relay that relays the data from the relay device to the destination mobile device in a defined supplemental uplink timeslot.

2. The method of claim 1, further comprising:
    scheduling the relay of the data according to a function of downlink throughput based upon at least one fairness criterion applied to the set of candidate mobile devices.

3. The method of claim 2, wherein the scheduling the relay includes scheduling according to a round-robin scheduling.

4. The method of claim 2, wherein the scheduling the relay includes scheduling the relay based upon a criterion of minimal fairness constraints.

5. The method of claim 2, further comprising utilizing a user cooperative communications protocol for the relay of the data.

6. The method of claim 5, wherein the utilizing includes utilizing an amplify-and-forward protocol.

7. The method of claim 5, wherein the utilizing includes utilizing a decode-and-forward protocol.

8. The method of claim 1, further comprising:
    allocating power for the destination mobile device and the relay device based on the determination.

9. The method of claim 1, further comprising estimating channel state information.

10. The method of claim 1, wherein the initiating the relay includes initiating a downlink-assisted relaying that relays in a defined supplemental downlink timeslot.

11. The method of claim 1, further comprising scheduling one or more uplink transmissions from respective one or more mobile devices that are different than the destination mobile device during the defined supplemental uplink timeslot, including selecting the one or more mobile devices to exclude mobile devices as a function of distance from the destination mobile device.

12. The method of claim 11, wherein the selecting the one or more mobile devices comprises selecting the one or more mobile devices to exclude mobile devices within a defined distance from the destination mobile device.

13. A system, comprising:
    a basestation device configured to select a relay device from a set of candidate relay devices and transmit according to an uplink-assisted relaying that relays a message, generated at the basestation device, from the relay device to a target device in a defined supplemental uplink timeslot, wherein the basestation device is further configured to select the relay device based on a signal-to-noise function for the relay device subject to respective peak power constraints for the set of candidate relay devices and a total relay power constraint.

14. The system of claim 13, wherein the message is relayed according to a user cooperative protocol including an amplify-and-forward cooperation protocol or a decode-and-forward cooperation protocol.

15. The system of claim 13, wherein the basestation device is further configured to transmit according to a downlink-assisted relaying that relays the message to the target device in a defined supplemental downlink timeslot.

16. The system of claim 13, wherein the basestation device is further configured to relay the message according to a throughput scheduling algorithm that does not impose fairness constraints on target devices or according to a round-robin scheduling algorithm as a function of one or more delays among target devices.

17. The system of claim 16, wherein the basestation device is further configured to schedule relay of the message according to the round-robin scheduling algorithm.

18. The system of claim 16, wherein the basestation device is further configured to schedule relay of the message according to the throughput scheduling algorithm.

19. The system of claim 13, wherein the basestation device is further configured to allocate power for transmission of the message based at least on the signal-to-noise function.

20. The system of claim 13, wherein the basestation device is further configured to schedule at least one uplink transmission from a respective at least one mobile device different than the target device during the defined supplemental uplink timeslot, wherein the basestation device is further configured to select the at least one mobile device to exclude at least one proximate mobile device as a function of distance from the target device.

21. An apparatus, comprising:
means for selecting a relay device from a plurality of candidate relay devices, including means for selecting the relay device to satisfy a function of respective signal-to-noise ratios for the plurality of candidate relay devices, wherein the function is subject to respective peak power constraints for the plurality of candidate relay devices and a total relay power constraint; and
means for relaying, via the relay device, at least part of data from the basestation device to a mobile device using uplink-assisted relaying, including means for relaying the at least part of the data from the relay device to the mobile device in a defined supplemental uplink timeslot.

22. The apparatus of claim 21, further comprising:
means for scheduling a relay transmission according to an equality of fairness applied to the plurality of candidate relay devices, wherein the means for scheduling the relay transmission includes means for scheduling according to a user cooperative communications protocol.

23. The apparatus of claim 22, wherein the means for scheduling the relay transmission includes means for scheduling according to a round-robin scheduling as a function of at least one delay among a set of mobile devices.

24. The apparatus of claim 22, wherein the means for scheduling the relay transmission includes means for scheduling without consideration of fairness for a set of mobile devices.

25. The apparatus of claim 21, wherein the means for relaying comprises means for relaying according to an amplify-and-forward protocol.

26. The apparatus of claim 21, wherein the means for relaying comprises means for relaying according to a decode-and-forward protocol.

27. The apparatus of claim 21, further comprising means for estimating channel state information to determine a relaying schedule.

28. The apparatus of claim 21, further comprising means for allocating power to the relay device as a function of the respective signal-to-noise ratios for the plurality of candidate relay devices subject to the respective peak power constraints for the plurality of candidate relay devices and the total relay power constraint.

29. A non-transitory computer-readable medium having instructions stored thereon, the instructions comprising:
instructions for selecting a relay device, from a set of candidate relay devices, for relay of data from a basestation device to a target device based on a solution to a function representing a signal-to-noise-ratio of a channel between the basestation device and the relay device subject to respective peak power constraints for the set of candidate relay devices and a total relay power constraint; and
instructions for scheduling the relay of data from the basestation device to the target device via the relay device according to an uplink-assisted relaying that performs the relaying in a supplemental uplink timeslot.

30. The non-transitory computer-readable medium of claim 29, further comprising instructions for processing the data based in part on a fairness criterion associated with one or more devices including the target device.

31. The non-transitory computer-readable medium of claim 29, further comprising instructions for performing a downlink-assisted relaying that performs a relaying operation in a supplemental downlink timeslot.

32. The non-transitory computer-readable medium of claim 31, further comprising instructions for dynamically adjusting power in accordance with the uplink-assisted relaying or the downlink-assisted relaying.

33. The non-transitory computer-readable medium of claim 29, further comprising instructions for dynamically updating a schedule of relay transmissions.

34. The non-transitory computer-readable medium of claim 33, further comprising instructions for altering a parameter to achieve enhanced uplink throughput or downlink throughput.

35. The non-transitory computer-readable medium of claim 29, further comprising instructions for processing the data according to an amplify-and-forward cooperation protocol or a decode-and-forward cooperation protocol.

36. The non-transitory computer-readable medium of claim 29, further comprising instructions for scheduling a set of mobile devices, different than the target device, for uplink transmission during the supplemental uplink timeslot, including instructions for excluding mobile devices from the set of mobile devices based on distance from the target device.

37. The apparatus of claim 36, wherein the means for excluding includes means for excluding the mobile devices based on a determination that the mobile devices are within a defined distance from the destination mobile device.

38. The non-transitory computer-readable medium of claim 36, wherein the instructions for excluding include instructions for excluding the mobile devices that are within a defined distance from the target device.

\* \* \* \* \*

UNITED STATES PATENT AND TRADEMARK OFFICE
CERTIFICATE OF CORRECTION

PATENT NO. : 8,416,729 B2
APPLICATION NO. : 12/037974
DATED : April 9, 2013
INVENTOR(S) : Lo et al.

It is certified that error appears in the above-identified patent and that said Letters Patent is hereby corrected as shown below:

On Title Page 2, item (56), under "OTHER PUBLICATIONS", in Column 1, Line 1, delete "al," and insert -- al., --, therefor.

In the Drawings:

In Fig. 12, Sheet 12 of 13, delete "(BSC) 602" and insert -- (BSC) 1202 --, therefor. (attached)

In the Specifications:

In Column 11, Line 40, delete "relays 530." and insert -- relays 630. --, therefor.

In Column 12, Line 18, delete "curves 846, 846" and insert -- curves 836, 846 --, therefor.

In Column 15, Line 40, delete "(DVD)" and insert -- (DVDs) --, therefor.

In the Claims:

In Column 18, Line 12, in Claim 4, delete "constraints." and insert -- constraint. --, therefor.

In Column 20, Line 46, in Claim 37, delete "apparatus of" and insert -- non-transitory computer-readable medium of --, therefor.

Signed and Sealed this
Third Day of September, 2013

Teresa Stanek Rea
*Acting Director of the United States Patent and Trademark Office*